350-174.   SR
09-28-71   XR   3,609,381

United States Patent

[11] 3,609,381

| [72] | Inventor | Edward D. Hartfield<br>Los Altos, Calif. |
|---|---|---|
| [21] | Appl. No. | 749,111 |
| [22] | Filed | July 31, 1968 |
| [45] | Patented | Sept. 28, 1971 |
| [73] | Assignee | Technical Operations, Inc.<br>Burlington, Mass. |

[54] ELECTRO-OPTIC LIGHT MODULATOR WITH BIREFRINGENT BEAMSPLITTER-RECOMBINER
14 Claims, 2 Drawing Figs.

[52] U.S. Cl. .................................................... 250/225,
350/150, 350/157, 350/174
[51] Int. Cl. .................................................... G02f 1/20,
G02f 1/26
[50] Field of Search............................................. 250/226,
225, 199; 350/147, 150–151, 152, 154, 160, 157,
158, 169, 174

[56]            References Cited
            UNITED STATES PATENTS
3,325,646   6/1967   Reichel et al. ................. 350/150 X
3,383,460   5/1968   Pritchard....................... 350/169 X
3,391,970   7/1968   Sincerbox...................... 350/157 X
3,430,048   2/1969   Rubinstein .................... 350/169 X
3,450,460   6/1969   Brown, Jr. ..................... 350/150
3,485,553   12/1969  Tzuo-Chang Lee ........... 350/150 X

*Primary Examiner*—Roy Lake
*Assistant Examiner*—David O'Reilly
*Attorneys*—Alfred H. Rosen and John H. Coult ABSTRACT: This disclosure depicts an electrooptic light modulator comprising a novel birefringent beamsplitter-recombiner transmitting a pair of orthogonally polarized beam components to a pair of field-controlled anisotropic crystals. Each of the pair of light beams from the beamsplitter is directed along a reiterative light path through a crystal and returned by means of an end mirror to the point of entrance of the beam into the crystal. After leaving the crystals, the beam components are reunited by the beamsplitter-recombiner; the composite beam is analyzed by a Glan prism. Thermal drift responsive means monitoring the operating point of the modulator controls a compensating DC bias potential applied across the beamsplitter medium.

PATENTED SEP 28 1971    3,609,381

EDWARD D. HARTFIELD
INVENTOR

BY: ALFRED H. ROSEN
and
JOHN H. COULT
ATTORNEYS

ELECTRO-OPTIC LIGHT MODULATOR WITH BIREFRINGENT BEAMSPLITTER-RECOMBINER

BACKGROUND OF THE INVENTION

In a two-beam electro-optic modulator as described and claimed in the referenced copending application, the beamsplitter-recombiner preferably performs the following functions: (1) it should be capable of splitting a polarized input beam, for example as might be produced by a continuous wave laser, into a pair of parallel, spatially displaced component beams; (2) the component beam should be identical in intensity; (3) the beamsplitter-recombiner should have bidirectional effectiveness, that is, it should be capable of both splitting an input beam and recombining the component beams after modulation thereof; and (4) it must be capable of withstanding high intensity continuous wave laser beams without any degradation in performance.

The referenced application concerns a two-beam electro-optic modulator including a beamsplitter-recombiner comprising an arrangement of totally and partially reflecting mirrors for dividing the input beam into a pair of competent beams and for recombining the component beams into a single output beam. In addition to being relatively expensive, this beamsplitter has the deficiency of producing secondary beams which may not be of identical intensity and further is optimal only at a single wavelength.

OBJECTS OF THE INVENTION

It is an object of this invention to provide an electro-optic light modulator with a beamsplitter-recombiner which meets all of the beam dividing and recombining requirements set forth above and which has lower optical losses and is less expensive than previous components performing these functions.

It is yet another object to provide a beamsplitter-recombiner capable of operating at any transmitted wavelength with no decrease in splitting efficiency.

It is another object to provide a beamsplitter-recombiner capable of use with equal efficiency with either polarized or unpolarized light.

It is still another object to provide an electro-optic light modulator with a novel beamsplitter-recombiner capable of assisting in providing bias and/or thermal drift control for the modulator.

Further objects of the invention will in part be obvious and will in part become apparent as the following description proceeds.

The feature of novelty which characterize the invention will be pointed out with particularity in the claims annexed to and forming a part of this specification.

BRIEF DESCRIPTION OF THE DRAWING

For a fuller understanding of the invention, reference may be had to the following detailed description taken in connection with the accompanying drawing wherein the FIGURES illustrate schematically and in perspective, an electro-optic modulator having a novel beamsplitter-recombine constructed in accordance with this invention.

DESCRIPTION OF THE PREFERRED EMBODIMENTS

Figures 1, 2:
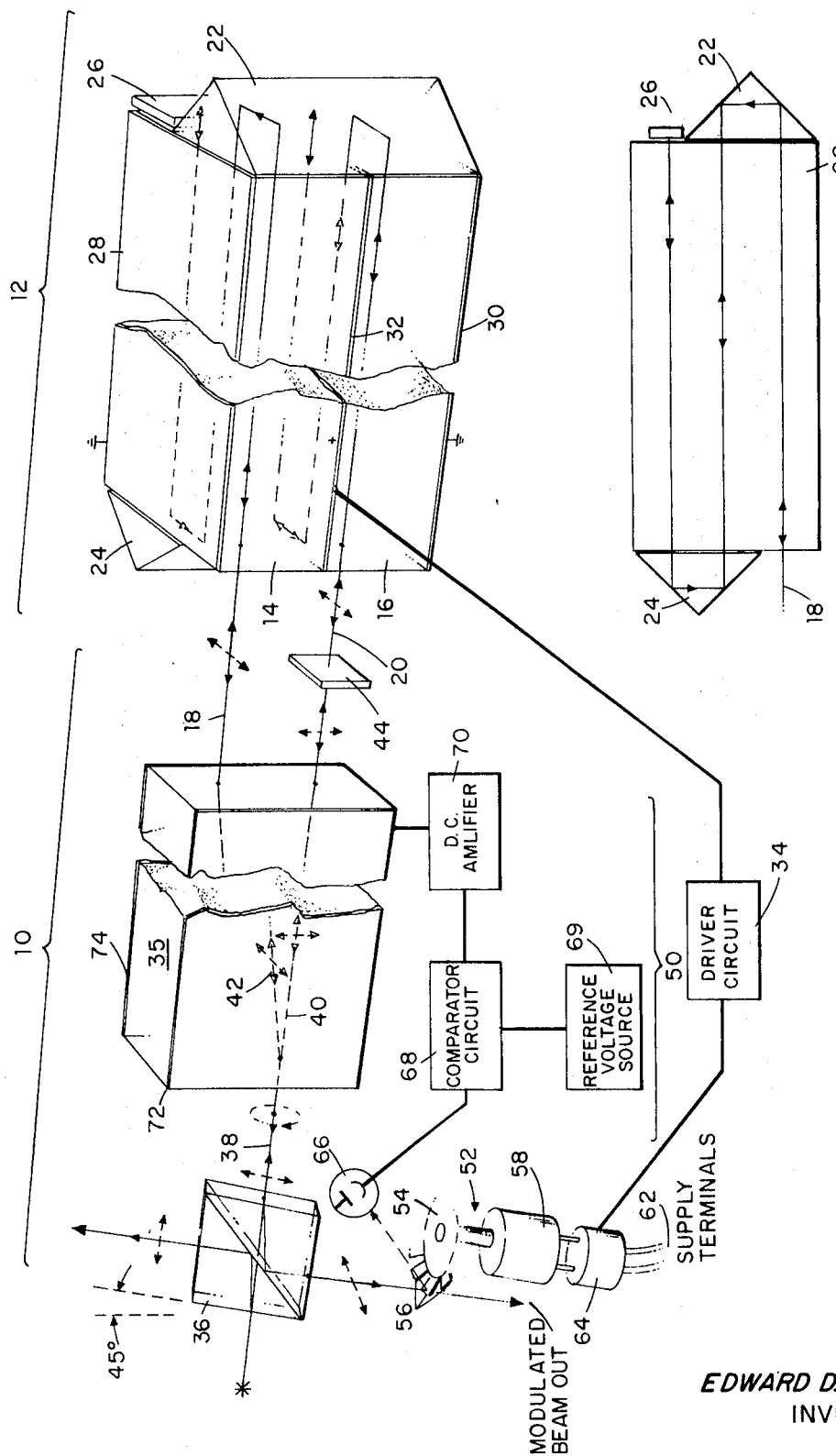
FIG. 1 illustrates a schematic perspective view of a system embodying the invention.
FIG. 2 is a plan view of the modulator stage forming a part of FIG. 1 system.

The drawing illustrates an electro-optic modulator representing a preferred implementation of the inventive concepts. The modulator comprises an input-output stage 10 for processing an input beam to provide a pair of component beams suitable for supply to a modulator stage 12 in which the component beams are phase modulated in accordance with information on an electrical signal supplied thereto. The invention may be better understood by first describing the modulator stage 12.

The modulator stage 12 comprises a pair of 45°Y-cut field dependent anisotropic crystals 14 and 16, preferably of the class $4\bar{2}$ m Ammonium dihydrogen phosphate and potassium dihydrogen phosphate are examples of the crystals $4\bar{2}$ m. which are suitable for use in this modulator. The crystals are disposed face-to-face in firm contact to insure that any thermal unwanted gradients existing across the crystals are identical in both crystals and thus compensated by the equality of effect on the component beams 18, 20 supplied to the crystals from the input-output stage 10 (discussed below). A pair of Porro prisms 22, 24 cemented on the longitudinal ends of the crystals 14, 16 and a flat end mirror 26 cooperate to establish a reiterative light path in the crystals which traverses the crystals laterally to the end mirror 26 and then back along the reiterative paths to the crystals entrance points.

The multiple light paths established through the crystals effectively multiplies the crystal length without increasing the crystal capacitance, and thus greatly reduces the voltage and power requirements on the electronic driving circuits, as well as decreasing the cost, temperature, and stability of the modulator.

An electrical field is applied across each of the crystals 14, 16 transverse to the respective planes in which the beams 18, 20 travel through the crystals. The fields are applied by means of electrodes 28 and 30 on the external surfaces of the crystals 14 and 16, respectively, and a third electrode 32 sandwiched between the crystals. The signals are applied from a driver circuit 34 so as to establish fields of opposite polarity across the crystals 14, 16, thus effectively doubling the modulation achievable with a single crystal.

By this invention a beamsplitter-recombiner is provided which is capable of dividing a polarized input beam into a pair of parallel, spatially displaced, component beams for supply to the modulator stage 12. The splitter-recombiner has a number of desirable characteristics not found in prior art devices intended to perform the same functions, as will be pointed out below. The beamsplitter-recombiner comprises a field-dependent anisotropic medium 35, preferably selected from the class $4\bar{2}$ m, such as KDP or ADP. A Glan polarizing prism 36 is disposed in an input beam 38 to plane polarize the beam at 45° with respect to the Y axis of the crystal, and thus at 45° to the fast and slow axes of the medium 35.

As the plane-polarized input beam enters the medium 35, it is resolved into a pair of orthogonal components 40, 42 oriented parallel to the slow and fast axes, respectively, of the medium 35. The relative intensity of the components is easily controlled by rotating the effective plane of polarization of the Glan prism 36. The component 40, representing the ordinary rays, vibrating in a plane including the optic axis of the medium 35 travels through the medium 35 undeviated. Component 42, representing the extraordinary rays, is deflected and diverges from component 40, emerging from the medium 35 to form a beam component parallel to and spatially displaced from the beam component 40.

In order that both of the component beams 40, 42 supplied to the crystals may have the same plane of polarization to insure an identical effect thereon by the respective crystals 16 and 14, a half-wave plate 44 is disposed in the beam component 40. The half-wave plate 44 performs a well-known function of rotating the plane of polarization by 90°. Thus, both of the beams 40, 42 are caused to have a like plane of polarization (horizontal in this illustration) as they traverse the crystals 16, 14.

In operation, plane polarized light entering the medium 35 from the Glan prism 36 is divided into a pair of parallel displaced beams 40, 42 of like polarization and equal intensity by the birefringent medium 35 and the half-wave plate 44. The beams are caused to traverse the electro-optic crystals 14, 16 three times before being reflected back along their reiterative paths three more times, exiting from the crystals along the entrance light path but in the opposite direction. As the beams traverse the crystals 14 and 16, each is phase modulated by a varying anisotropy of the crystals caused by the information-bearing electrical field impressed upon the crystals. Because the direction of the field through the crystals is of the opposite polarity, the phase shift produced in the two beams is of like magnitude but of opposite direction, thus causing an effective doubling of the phase displacement which would be produced with a single crystal.

The modulated beams exit from the crystals and are returned along the same light paths which they followed to the crystals, being joined in a common beam of elliptical polarization before entering the 40 prism 36. The Glan prism 36 acts as an analyzer to produce a modulated output beam whose intensity varies in accordance with the voltage signal impressed upon the electro-optic crystals 14 and 16 in the modulator stage 12.

In accordance with this invention, means are provided for controlling the operating or bias point of the modulator stage 12. The bias control concepts and apparatus to be described have general application for bias control, however, by way of illustration the described embodiment is illustrated as being adapted for thermal drift control.

Referring to the drawing, thermal drift control means 50 is illustrated as comprising a beam sampling apparatus 52 for deflecting the modulated output beam periodically during the "off" time of the system duty cycle, that is, that portion of the duty cycle during which no output voltage is produced by the modulator driver circuit 34. The beam sampling apparatus 52 may comprise a chopper wheel 54 having mirrorized teeth 56 for periodically intercepting and deflecting the output beam. The wheel 54 may be driven by an electric motor 58 in synchronism with the driver circuit 34 by connecting the motor 58 to its supply voltage terminals 62 through a regulator circuit 64 controlled by the driver circuit 34.

The output beam samples deflected by the chopper wheel 54 are intercepted by a photodetector 66. A comparator circuit 68 is responsive to the output of the photodetector 66 and to a (preferably adjustable) reference voltage source 69 set equal to the photodetector DC output voltage at the desired (no voltage) modulator operating point. The comparator produces a DC output voltage the magnitude of which characterizes the separation between the compared photodetector and reference signals. A DC amplifier 70 amplifies the signal received from the comparator circuit 68.

The amplified DC signal is delivered to electrode 72 of a pair of electrodes 72, 74 embracing the medium 35 transverse to the direction of the light paths through the medium 35. A variable DC field is thus established through the medium which is effective to vary the anisotropy of the medium 35.

In operation, any variation in temperature causing the bias point of the modulator stage 12 to shift will result in an alteration in magnitude of the (unmodulated) sampled output beam as sensed by the photodetector 66. The output of the comparator circuit 68, and thus the electric field impressed across the medium 35, will vary correspondingly to adjust the relative phase of the component beam 18, 20, returning the modulator stage to its original and intended operating point.

The described bias control means allow use of relatively low DC bias voltages for full correction of a half-wave retardation and provides capability of adjustment of both the magnitude and polarity of the compensation needed. Further, the above-described bias control apparatus allows correction to be accomplished during the active portion of the modulator duty cycle. In addition, the operating point of the modulator may be varied simply by adjusting the magnitude of the reference voltage.

Because of the high bulk resistivity of the medium material, the power requirements of the compensating DC voltage source are very small, thereby allowing the use of solid state circuitry.

Still further, by this invention, wherein operating point control is achieved externally of the modulator stage 12, the operating frequency range of the modulator is independent of the compensation apparatus and may thus be extended substantially to DC.

The invention is not limited to the particular details of construction of the embodiments depicted, and it is contemplated that various other modifications and applications will occur to those skilled in the art. Apparatus other than as shown may be used to detect drift or variation of the modulator operating point and to produce a DC signal proportional in strength to the drift and of the correct polarity. By this invention this DC signal is fed back to a field-dependent anisotropic medium serving dually as a beamsplitter (and preferably also as a recombiner), to compensate for the drift, as described above.

Whereas a single birefringent crystal is shown in the beamsplitting-recombining section, it very well may be preferred to use a plurality of smaller crystals. It is well within the compass of this invention to use a modulator which does not return the beam to the beamsplitter, in which case the beamsplitter would not, of course, serve also to recombine the component beams. Beam polarizing and analyzing means other than as depicted may be employed. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. In combination:
   an optical beamsplitter-recombiner comprising an anisotropic medium for splitting an input light beam into two parallel displaced components having orthogonal polarization;
   optical means in the path of said beam components for operating upon said beam components to effect a variation of a characteristic of one of said components relative to the other of said components said optical means including reflective means for returning said beam components to said splitter-recombiner, said anisotropy of said medium effecting a recombination of said beam components to form a single output beam.

2. The combination of claim 1 wherein said optical means is an electro-optic modulator for phase modulating at least a component of at least one of said beam component.

3. The combination of claim 2 wherein said splitter-recombiner medium exhibits a field-dependent anisotropy and wherein said combination includes means for applying an adjustable but substantially unvarying electric field across said medium.

4. An electro-optic modulator for modulating a polarized laser beam, comprising:
   an optical beamsplitter comprising an anisotropic medium for splitting an input light beam into two parallel displaced components having orthogonal polarization and equal intensity;
   an electro-optic medium exhibiting a field-dependent anisotropy;
   guide means for defining a light path for said first beam component through said electro-optic medium and for defining a light path for said second beam component, said guide means including reflective means contiguous with opposite boundaries of said electro-optic medium for causing said first beam light path to be reiterative;
   parallel spaced electrode means arranged across said field-dependent anisotropic medium for establishing an electric field transverse to said first beam light path upon application of a signal voltage thereto for phase modulating at least a component of said first beam component;
   means for reuniting said beam components to form an output beam; and
   analyzing means in said output beams for resolving said beam components in a common plane to cause an intensity modulation of said output beam.

5. The apparatus defined by claim 4 wherein said reflective means includes means for returning said beam components back along their respective reiterative light paths, and wherein said beamsplitter is effective, due to its anisotropic properties, to accomplish said reunion of said beam components.

6. The apparatus defined by claim 5 wherein a Glan prism is located in a common input-output path thus formed for plane polarizing said beam input beam and for acting as said analyzing means in said output beam.

7. The apparatus defined by claim 4 wherein said anisotropic beamsplitter-recombiner medium is also field-dependent, and wherein said apparatus includes bias control means for applying an adjustable but substantially unvarying electric field across said splitter-recombiner medium.

8. The apparatus defined by claim 7 wherein said control means comprises means for extracting a portion of the energy from said output beam, photodetection means positioned to receive said output beam portion, means responsive to said photodetection means for developing a DC bias signal the magnitude of which characterizes the output from said photodetection means, and means responsive to said DC bias signal for establishing an electric field transversely across said beamsplitter-recombiner medium.

9. An electro-optic modulator for modulating a polarized laser beam, comprising:
   an optical beamsplitter comprising an anisotropic medium for splitting an input light beam into two parallel displaced components having orthogonal polarization;
   first and second electro-optic media each exhibiting a field-dependent anisotropy;
   guide means for defining first and second light paths for said beam components through said first and second electro-optic media, respectively, said guide means including reflective means contiguous with opposite boundaries of said first and second media for establishing respective reiterative light paths through said media;
   parallel spaced electrode means arranged across each of said first and second electro-optic media to establish respective electric fields of opposite polarity transversely across said first and second light paths upon application of signal voltages thereto for phase modulating at least a component of each of said component beams;
   means for reuniting said beam components to form an output beam; and
   analyzing means in said output beam for resolving said beam components in a common plane to cause an intensity modulation of said output beam.

10. The apparatus defined by claim 9 wherein said reflective means includes means for returning said beam components back along their respective reiterative paths, and wherein said beamsplitter is effective due to its anisotropic properties to accomplish said reunion of said beam components.

11. The apparatus defined by claim 10 wherein said anisotropic beamsplitter-recombiner medium is also field-dependent, and wherein said apparatus includes bias control means for applying an adjustable but substantially unvarying electric field across said splitter-recombiner medium.

12. The apparatus defined by claim 11 wherein said bias control means comprises:
   sampling means for sampling said output beam at predetermined intervals;
   photodetection means positioned to receive said samples;
   means responsive to said photodetection means for developing a DC bias signal the magnitude and polarity of which characterizes the output from said photodetection means; and
   means responsive to said DC bias signal for establishing an electric field transversely across said beamsplitter medium.

13. The apparatus defined by claim 12 wherein said means responsive to said photodetection means includes a comparator circuit responsive to the output of said photodetection means and to a reference voltage representing the known output of said photodetection means at a predetermined operating point of said modulator for producing a DC signal characterizing the output of said photodetection means relative to said reference voltage.

14. The apparatus defined by claim 3 wherein a Glan prism is located in a common input-output path formed for plane polarizing said input beam and for acting as said analyzing means in said output beam.